United States Patent
Otani et al.

(10) Patent No.: US 11,486,116 B2
(45) Date of Patent: Nov. 1, 2022

(54) REMOTE OPERATION DEVICE FOR CONSTRUCTION MACHINE

(71) Applicant: KOBELCO CONSTRUCTION MACHINERY CO., LTD., Hiroshima (JP)

(72) Inventors: Masaki Otani, Hiroshima (JP); Seiji Saiki, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 17/287,855

(22) PCT Filed: Nov. 1, 2019

(86) PCT No.: PCT/JP2019/042987
§ 371 (c)(1),
(2) Date: Apr. 22, 2021

(87) PCT Pub. No.: WO2020/095830
PCT Pub. Date: May 14, 2020

(65) Prior Publication Data
US 2021/0381197 A1 Dec. 9, 2021

(30) Foreign Application Priority Data
Nov. 7, 2018 (JP) .............................. JP2018-209765

(51) Int. Cl.
*E02F 9/20* (2006.01)
*E02F 9/26* (2006.01)
(Continued)

(52) U.S. Cl.
CPC ................ *E02F 9/205* (2013.01); *E02F 9/26* (2013.01); *H04N 5/247* (2013.01);
(Continued)

(58) Field of Classification Search
CPC ......... G06F 3/011; G06F 3/013; H04N 5/247; H04N 5/2628; H04N 7/181; H04N 7/18;
(Continued)

(56) References Cited

U.S. PATENT DOCUMENTS

2015/0198936 A1 7/2015 McGee et al.
2017/0016211 A1* 1/2017 Arimatsu ................ E02F 9/264
(Continued)

FOREIGN PATENT DOCUMENTS

EP 0 976 879 A1 2/2000
JP 7-36610 A 2/1995
(Continued)

OTHER PUBLICATIONS

International Search Report dated Dec. 24, 2019 in PCT/JP2019/042987 filed on Nov. 1, 2019, 2 pages.
(Continued)

*Primary Examiner* — Thai Q Tran
*Assistant Examiner* — Nienru Yang
(74) *Attorney, Agent, or Firm* — Oblon, McClelland, Maier & Neustadt, L.L.P.

(57) ABSTRACT

A remote operation device includes an image generating section that generates, when an operation determining section determines that an operation by an operator is a fine operation, and a posture determining section determines that a posture of the operator has changed from a reference posture to a watching posture, an enlarged image by enlarging a part of a work image of a construction machine, the part being related to a line-of-sight position acquired by an eye tracking device, and causes a display device to display the enlarged image.

7 Claims, 13 Drawing Sheets

(51) Int. Cl.
*H04N 5/247* (2006.01)
*H04N 5/262* (2006.01)
*H04N 7/18* (2006.01)
*G06F 3/01* (2006.01)

(52) U.S. Cl.
CPC .......... *H04N 5/2628* (2013.01); *H04N 7/181* (2013.01); *G06F 3/013* (2013.01)

(58) Field of Classification Search
CPC .... H04N 5/262; G08C 17/02; G08C 2201/30; E02F 9/26; E02F 9/2004; E02F 9/261; E02F 9/16; E02F 9/205; E02F 9/20
USPC .......................................................... 348/159
See application file for complete search history.

(56) References Cited

U.S. PATENT DOCUMENTS

2017/0308074 A1   10/2017  Kandula et al.
2017/0322624 A1*  11/2017  Niccolini ................ G06F 3/013

FOREIGN PATENT DOCUMENTS

| JP | 2002-294762 A | 10/2002 |
| JP | 2003-293388 A | 10/2003 |
| JP | 2009-43003 A | 2/2009 |
| JP | 2012-172424 A | 9/2012 |
| JP | 2017-71942 A | 4/2017 |
| JP | 2018-501684 A | 1/2018 |
| WO | WO 2017/176143 A1 | 10/2017 |

OTHER PUBLICATIONS

Extended European Search Report dated Oct. 13, 2021 in European Patent Application No. 19882453.4, 7 pages.

* cited by examiner

US 11,486,116 B2

REMOTE OPERATION DEVICE FOR CONSTRUCTION MACHINE

TECHNICAL FIELD

The present invention relates to a remote operation device for remotely operating a construction machine from a remote place distant from the construction machine.

BACKGROUND ART

Generally, a construction machine, such as a hydraulic excavator, is used for excavation work of excavating the ground and loading work of loading earth and sand dug out of the ground onto a cargo bed of a dump truck or the like. The construction machine is also used for other types of work different from the above work. For example, the construction machine is also used for a type of work involving a fine operation, such as ground leveling work of leveling the ground, which requires precise adjustment of a position of a tip attachment (specifically, a position of a bucket). To carry out such work involving the fine operation, an operator carefully operates an operation lever while visually checking the position of the bucket.

Recently, a technique has been proposed, in which an operator operates a remote operation lever while visually checking a construction machine displayed on a display device disposed in a remote place distant from the construction machine, thereby remotely operating the construction machine. In such a case where the operator carries out the fine operation in a remote place, in order to improve the efficiency of work involving the fine operation, it is important to cause the display device to display an object the operator observes upon carrying out the fine operation (e.g., the bucket), in an understandable form at proper timing.

Patent Literature 1 discloses a driving assistance device for allowing a driver to visually recognize an image of a watching target, the driver turning the eyes on the watching target while driving, in an understandable form and real-time manner. The driving assistance device of Patent Literature 1 captures an image of the watching target, which the driver watches while driving, creates an enlarged image of the captured image, and superposes, on a display monitor, the enlarged image on a location where the watching target is situated in a scene outside a vehicle.

Patent Literature 2 discloses a monitoring camera device for a construction machine, the monitoring camera device automatically switching an image according to an operation by an operator, thus eliminating a work interruption problem to improve work efficiency. Specifically, when a travelling detection signal indicative of execution of a travelling operation is input, the monitoring camera device for the construction machine of Patent Literature 2 switches an image on a display, from an image fed by a front monitoring camera to an image fed by a rear monitoring camera.

However, the driving assistance device disclosed in Patent Literature 1 constantly displays an enlarged image of the watching target for the driver, and this approach does not allow the device to make a precise determination on a fine operation and a normal operation. For this reason, when an operator carries out the fine operation through remote operation, the device fails to cause a display device disposed in a remote place to display an image the operator needs at proper timing. Patent Literature 1 makes no suggestion concerning such a problem.

Operation information indicating manipulation of an operation lever by an operator, the operation information being used as criteria for image switching, may be used as criteria for determining whether a travelling operation for causing the construction machine to travel has been executed, as in the case of Patent Literature 2. However, in a case where whether the operator has an intention to carry out the fine operation is determined based only on the operation information on the operation lever, the precision of such a determination is, in fact, not always high.

CITATION LIST

Patent Literature

Patent Literature 1: JP 2009-43003 A
Patent Literature 2: JP 2002-294762 A

SUMMARY OF INVENTION

An object of the present invention is to provide a remote operation device for a construction machine, the remote operation device causing a display device disposed in a remote place to display an image an operator needs in an understandable form at proper timing when the operator carries out a fine operation through remote operation, thereby improving work efficiency in carrying out the fine operation.

Provided is a remote operation device for remotely operating a construction machine having an attachment from a remote place distant from the construction machine, the remote operation device including: an image acquiring device that acquires a work image of the construction machine; a display device that displays the work image at the remote place; an operator's seat in which an operator sits at the remote place; a remote operation lever to which an operation is applied by the operator sitting in the operator's seat, the operation being an operation for causing the attachment to move; an eye tracking device that acquires a line-of-sight position of the operator sitting in the operator's seat; a posture tracking device that acquires posture information on a posture of the operator sitting in the operator's seat; an operation determining section that determines whether the operation applied to the remote operation lever is a fine operation, based on operation information on the operation; a posture determining section that identifies a reference posture of the operator, based on the posture information, the posture determining section determining whether the posture of the operator has changed from the reference posture to a watching posture related to the fine operation, based on the posture information; and an image generating section that generates, when the operation determining section determines the operation to be the fine operation and the posture determining section determines that the posture of the operator has changed from the reference posture to the watching posture, an enlarged image by enlarging a part of the work image, the part being related to the line-of-sight position acquired by the eye tracking device, and causes the display device to display the enlarged image.

DESCRIPTION OF EMBODIMENTS

Embodiments of the present invention will hereinafter be described with reference to the drawings.

Figure 1:
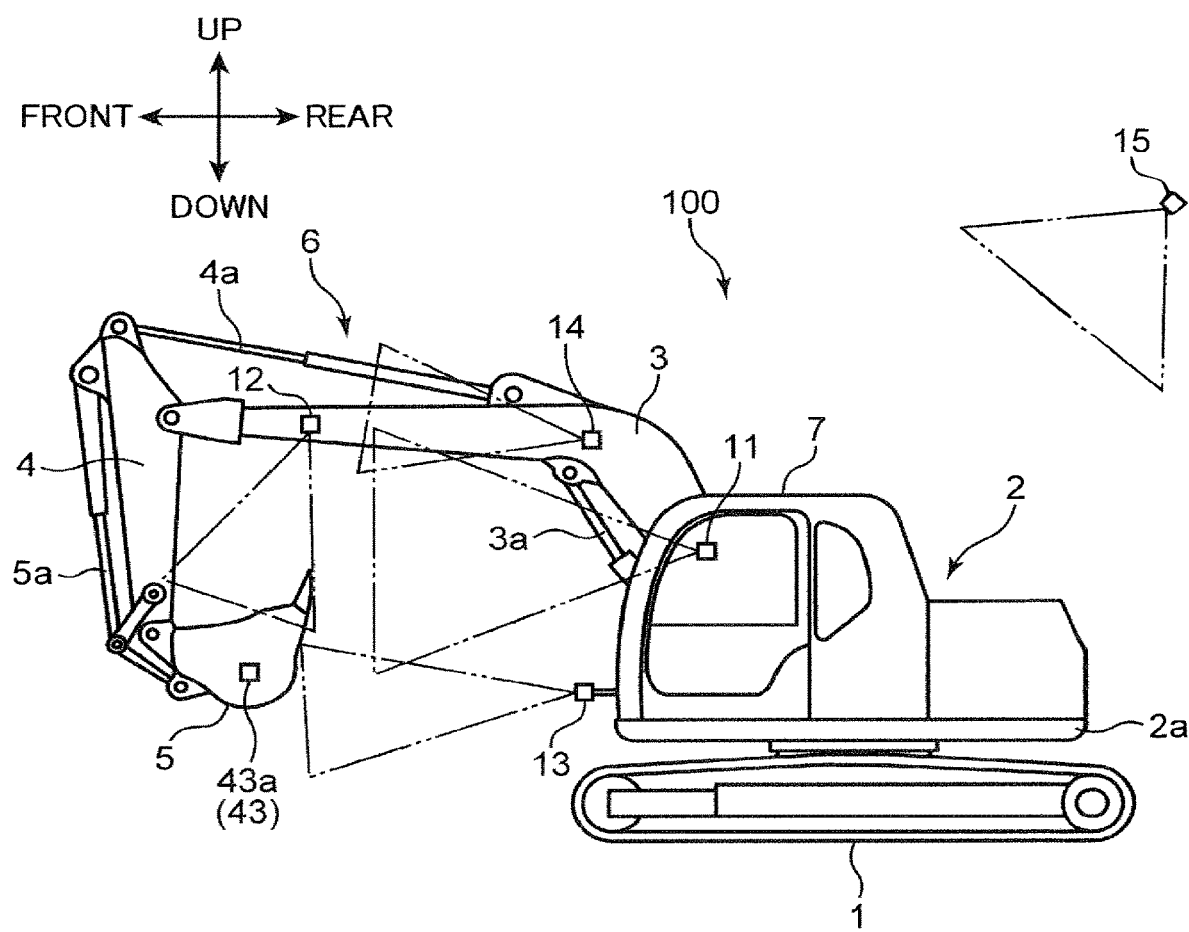
FIG. 1 is a side view of an example of a construction machine remotely operated by a remote operation device according to an embodiment of the present invention.
Figure 2:
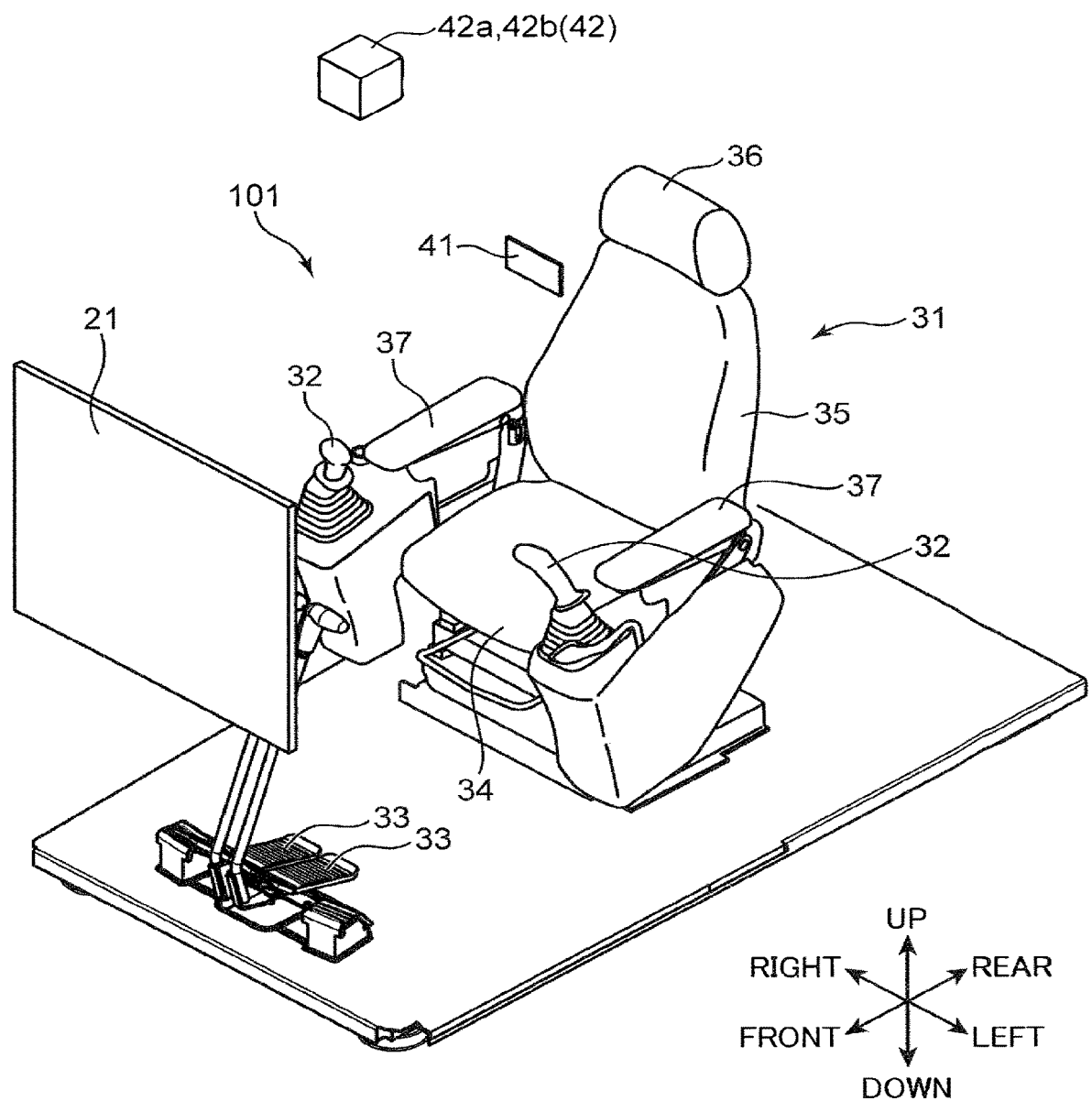
FIG. 2 is a perspective view showing a display device, an operator's seat, remote operation levers, an eye tracking device, and a posture tracking device of the remote operation device.
Figure 3:
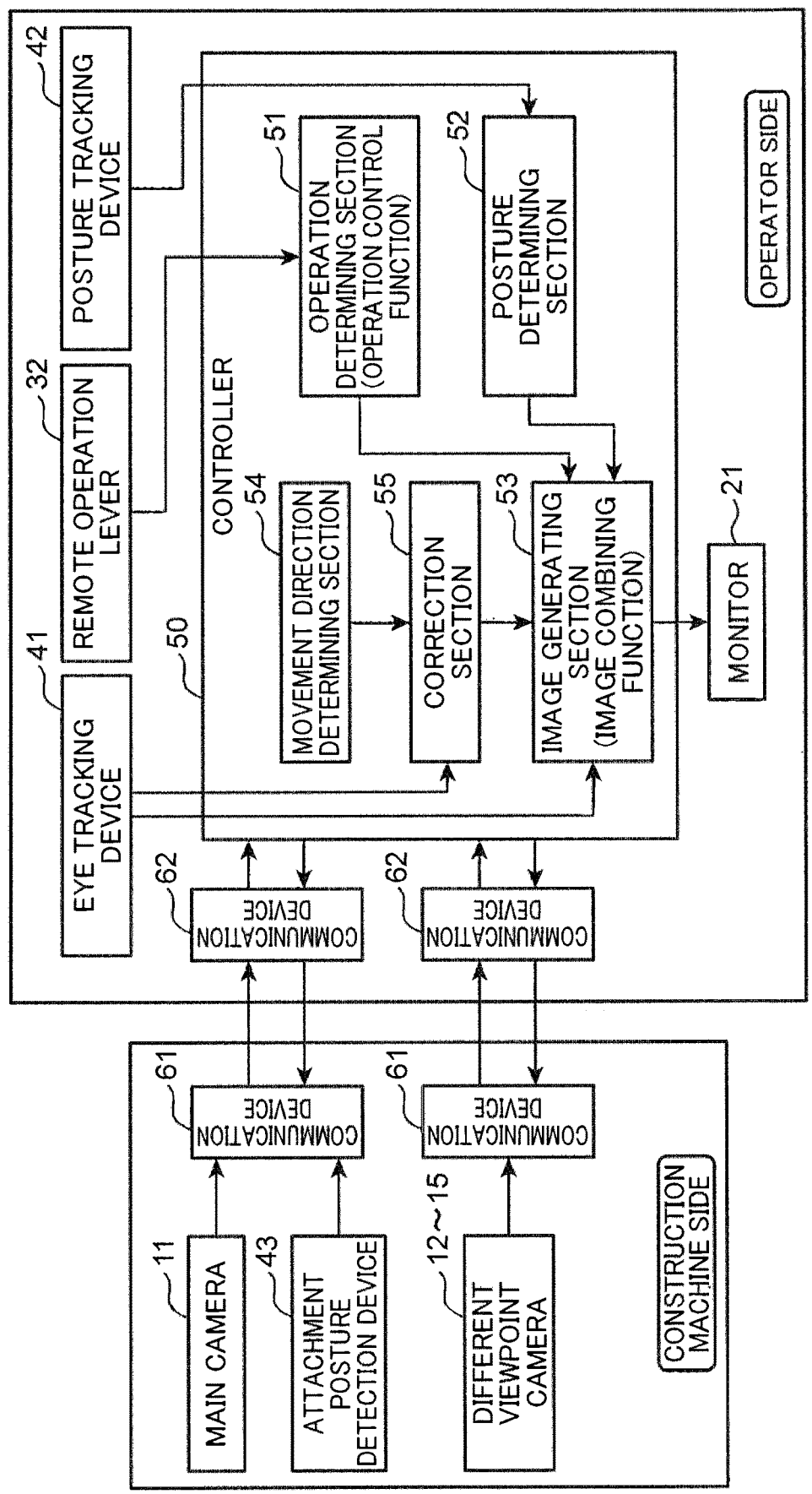
FIG. 3 is a block diagram showing a functional configuration of the remote operation device according to the embodiment of the present invention.

FIG. 1 is a side view of a hydraulic excavator 100 that is an example of a construction machine remotely operated by a remote operation device according to an embodiment of the present invention. FIG. 2 is a perspective view of a remote operation device 101. FIG. 3 is a block diagram showing a functional configuration of the remote operation device 101. The construction machine (hydraulic excavator 100 of this embodiment) and the remote operation device 101 make up a remote operation system.

In FIGS. 1 and 2, directions are indicated as "up", "down", "left", "right", "front", and "rear". These directions are indicated to facilitate description of respective structures of the remote operation device 101 and the hydraulic excavator 100 according to the embodiment of the present invention, and do not set a limit to movement directions of the hydraulic excavator 100 or forms of using the same.

As shown in FIG. 1, the hydraulic excavator 100 includes a lower travelling body 1, an upper slewing body 2 slewably mounted on the lower travelling body 1, and an attachment 6 attached to the upper slewing body 2. The upper slewing body 2 has a slewing frame 2a coupled to the lower travelling body 1, and a cab 7 mounted on the slewing frame 2a. The attachment 6 includes a boom 3 coupled to a front end of the slewing frame 2a so as to be able to rise and fall, an arm 4 turnably coupled to a tip end of the boom 3, and a bucket 5 (example of a tip attachment) turnably coupled to a tip end of the arm 4. The cab 7 is mounted on a front part of the slewing frame 2a, where the cab 7 is located adjacent to the boom 3 in the left-to-right direction of the slewing frame 2a. The cab 7 is an operator's cab in which an operator operates the hydraulic excavator.

The hydraulic excavator 100 further includes a plurality of hydraulic actuators 3a, 4a, and 5a that cause the attachment 6 to move, a slewing motor (not illustrated) that causes the upper slewing body 2 to slew, and a travelling motor (not illustrated) that causes the lower travelling body 1 to travel. The plurality of hydraulic actuators include a boom cylinder 3a that causes the boom 3 to move, an arm cylinder 4a that causes the arm 4 to move, and a bucket cylinder 5a (tip attachment cylinder) that causes the bucket 5 to move.

The remote operation device 101 according to this embodiment is a device for remotely operating the hydraulic excavator 100 from a remote place distant from the hydraulic excavator 100. According to the embodiment illustrated in FIGS. 1 to 3, the remote operation device 101 includes a plurality of cameras 11 to 15, a monitor 21, an operator's seat 31, a pair of remote operation levers 32 and 32, a pair of travelling pedals 33 and 33, an eye tracking device 41 (line-of-sight measuring device), a posture tracking device 42 (posture measuring device), an attachment posture detection device 43, a controller 50, and communication devices 61 and 62.

The plurality of cameras 11 to 15, the attachment posture detection device 43, and the communication devices 61 are disposed on the hydraulic excavator 100 of FIG. 1 or in the vicinity thereof. The monitor 21, the operator's seat 31, the pair of remote operation levers 32 and 32, the pair of travelling pedals 33 and 33, the eye tracking device 41, the posture tracking device 42, and the communication devices 62 are disposed in a remote place shown in FIG. 2, which is distant from the hydraulic excavator 100.

The plurality of cameras 11 to 15 include a main camera 11 (an example of an image acquiring device) and a plurality of different viewpoint cameras 12 to 15 (examples of a different image acquiring device). The plurality of cameras 11 to 15 are devices that can capture images. Specifically, the cameras 11 to 15 can capture moving images. Each of the plurality of cameras 11 to 15 has a given viewing angle (e.g., a viewing angle indicated by a two-dot chain line in FIG. 1) and is configured to capture an image in a range defined by the given view angle. Information on images acquired by the plurality of cameras 11 to 15 (image signal) is input to the controller 50 disposed in the remote place, via the communication devices 61 and 62 shown in FIG. 3.

As shown in FIG. 1, the main camera 11 acquires a main image (work image) that is an image of a work area of the hydraulic excavator 100 and that corresponds to a visual field of the operator sitting in a seat in the operator's cab, i.e., the cab 7. The main camera 11 is set, for example, at a position corresponding in height to the eyes of the operator sitting in the seat in the operator's cab, i.e., the cab 7, and has a forwardly expanding visual field so as to be able to capture an image of a principle part of the attachment 6, such as the arm 4 and the bucket 5.

The plurality of different viewpoint cameras 12 to 15 have their respective visual fields different from the visual field of the main camera 11, and acquire different images different from the work image acquired by the main camera 11. Among the plurality of different viewpoint cameras 12 to 15, the different viewpoint cameras 12 and 13 serve as tip attachment cameras that acquire images (different images) of the bucket 5 (an example of the tip attachment). Specifically, the different viewpoint camera 12 is arranged in the boom 3, and has a visual field that roughly expands downward from a position at which the different viewpoint camera 12 is attached to the boom 3. The different viewpoint camera 13 is arranged in the upper slewing body 2, and has a visual field that roughly expands forward from a position at which the different viewpoint camera 13 is attached to the upper slewing body 2. These different viewpoint cameras 12 and 13 thus acquire images of the bucket 5. The different viewpoint camera 14 is a camera that acquires an image (different image) of the boom 3 or the arm 4. Specifically, the different viewpoint camera 14 is attached to the boom 3, and has a visual field that roughly expands forward from a position at which the different viewpoint camera 14 is attached to the boom 3. The different viewpoint camera 15 is a camera that acquires an overall image of the hydraulic excavator 100. Specifically, the different viewpoint camera 15 is disposed at a position where the different viewpoint camera 15 can capture an overall image of the hydraulic excavator 100 from behind the hydraulic excavator 100.

The monitor 21 is an example of a display device that displays images acquired by the plurality of cameras 11 to 15 in the remote place. The monitor 21 receives information on an image (image signal), which is input to the controller 50 via the communication devices 61 and 62, and displays the image. The monitor 21 can simultaneously display, in a plurality of divided screen areas, a plurality of images acquired by the plurality of cameras 11 to 15. The monitor 21 can also selectively display some of the plurality of images acquired by the plurality of cameras 11 to 15. Switching such image display patterns is controlled by an image generating section 53 (to be described later) of the controller 50.

Figure 4:
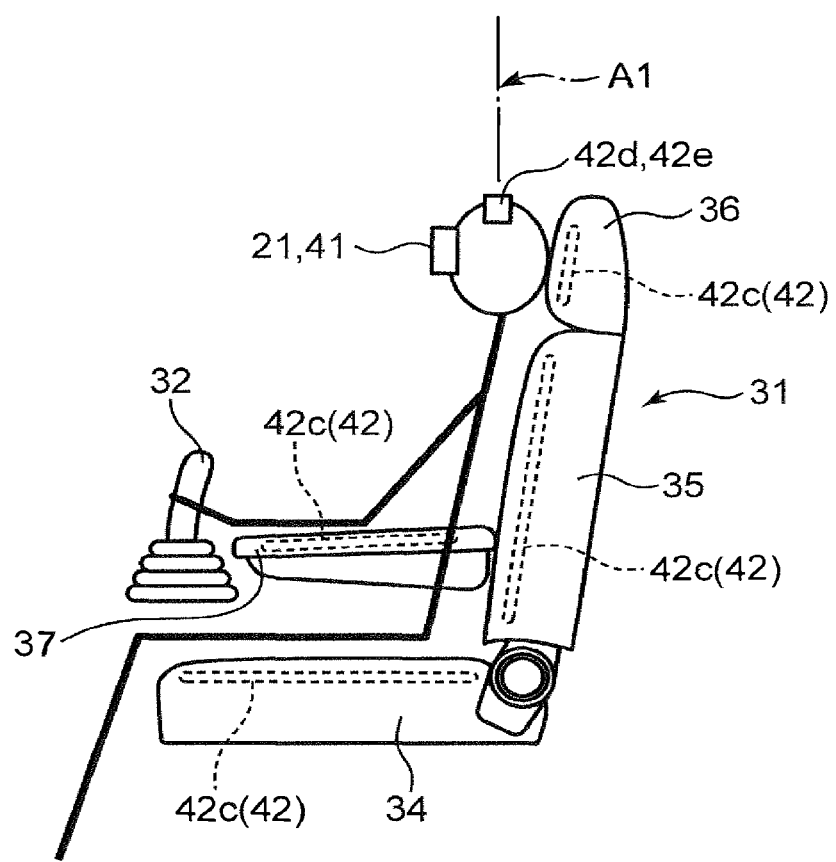
FIG. 4 is a side view schematically showing a reference posture of an operator sitting in the operator's seat of the remote operation device.
Figure 5:
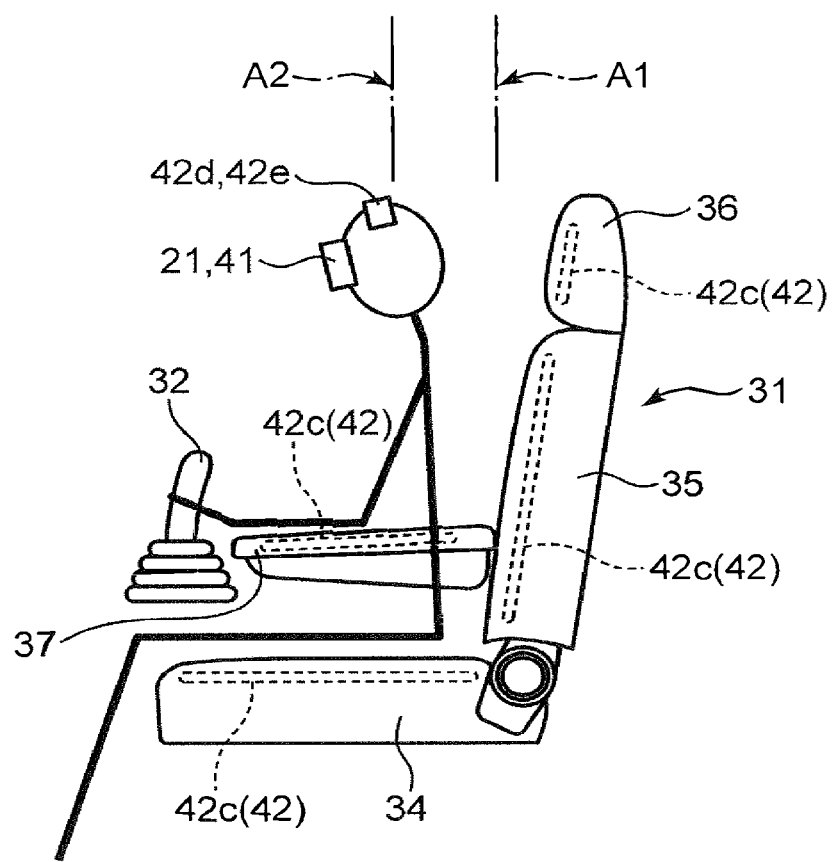
FIG. 5 is a side view schematically showing a posture (watching posture) that the operator sitting in the operator's seat of the remote operation device takes when carrying out a fine operation.

As shown in FIG. 2, the monitor 21 may be provided as a display, such as a liquid crystal display and an organic electroluminescence display. In such a case, the monitor 21 is disposed at a position that allows the operator sitting in the operator's seat 31 to observe an image displayed on the monitor 21. In another case, the monitor 21 may be provided as a head mount display 21 fitted on the operator's head, as shown in FIGS. 4 and 5, which will be described later. However, the display device of the present invention is not limited to these displays. It may also be provided as, for example, a projector (not illustrated) that projects an image onto a screen or the like.

The operator's seat 31 is a seat in which the operator sits in the remote place. The operator's seat 31 includes a seat 34, a backrest 35, a headrest 36, and left and right armrests 37 and 37. The seat 34 supports the lower half of the operator's body, specifically, the buttocks and a part of the legs (thighs). The backrest 35 supports the upper half of the operator's body, specifically, the back. The headrest 36 supports the operator's head, specifically, the back of the head.

The left and right armrests 37 and 37 support the operator's forearms when the operator, who is sitting in the operator's seat 31, operates the operation levers 32 and 32. The left and right armrests 37 and 37 each have a longitudinally elongated shape so as to be able to support the operator's forearm. The left and right armrests 37 and 37 are arranged respectively on the left side and the right side of the seat 34.

Each of the pair of remote operation levers 32 and 32 turns forward, backward, left, or right, when an operation is applied to the lever by the operator sitting in the operator's seat 31 in the remote place. This operation is an operation for causing the attachment 6 to move. Operations for causing the attachment 6 to move include a rising and falling operation for causing the boom 3 to make a rise and fall movement relative to the upper slewing body 2, a turning operation for causing the arm 4 to make a turning movement relative to the boom 3, a turning operation for causing the bucket 5 to make a turning movement relative to the arm 4, and a slewing operation for causing the upper slewing body 2 to make a slewing movement relative to the lower travelling body 1, thereby causing the attachment 6 to slew.

The pair of travelling pedals 33 and 33 are pedals for causing the lower travelling body 1 to travel. The operator sitting in the operator's seat 31 steps on the left and right travelling pedals 33 and 33 located in front of the operator's seat 31, thus causing the lower travelling body 1 to travel.

When an operation is applied to each remote operation lever 32 by the operator, each remote operation lever 32 generates an operation signal (operation-based signal) corresponding to a state (operation state) of the operation lever 32, the state being determined according to an operation amount, an operation direction, and the like of the operation, and inputs the operation signal to the controller 50. Specifically, the operation state of each remote operation lever 32, the operation state being determined according to the operation amount, the operation direction, and the like, is converted to an electric signal (operation signal), which is input to the controller 50. Likewise, when a step-on operation is applied to each travelling pedal 33 by the operator, each travelling pedal 33 generates an operation signal corresponding to an amount of the operator's stepping on the travelling pedal 33, and inputs the operation signal to the controller 50. Each remote operation lever 32 includes a lever body to which an operation is applied by the operator, and an operation signal generating section that generates the operation signal corresponding to an operation amount, an operation direction, and the like of the operation and that inputs the operation signal to the controller 50.

The operation signal input to the controller 50 is then input to a controller (not illustrated) of the hydraulic excavator 100, via the communication devices 61 and 62. The controller of the hydraulic excavator 100 properly carries out signal processing, such as calculations, based on the incoming operation signal, to generate an instruction signal corresponding to the operation signal. The instruction signal is input to control valves and the like for actuating the boom cylinder 3a, the arm cylinder 4a, the bucket cylinder 5a, the slewing motor, the travelling motor, and the like. Thus, by operating the remote operation levers 32 and 32, the operator can cause the hydraulic excavator 100 to make various movements, which include, specifically, a slewing movement of the attachment 6 (upper slewing body 2), a rising and falling movement of the boom 3, a turning movement of the arm 4, a turning movement of the bucket 5, and a travelling movement of the lower travelling body 1.

The eye tracking device 41 is configured to acquire line-of-sight information on a line-of-sight position of the operator in the remote place for eye tracking. An eye tracking technique is not particularly limited. Various known eye tracking techniques can be adopted. The eye tracking device 41 is configured to track the movement of the operator's line of sight in a real-time manner and consecutively measure the line-of-sight position of the operator. Line-of-sight information on the line-of-sight position of the operator, the line-of-sight information being acquired by the eye tracking device 41, is input to the controller 50. The eye tracking device 41 is fitted on, for example, the operator's head. When the display device is provided as the head mount display, the eye tracking device 41 is attached to the head mount display.

The posture tracking device 42 is configured to acquire posture information on a posture of the operator sitting in the operator's seat for posture tracking. According to this embodiment, posture tracking is used to identify a posture that the operator takes when carrying out normal work, such as excavation work and transfer work (which will hereinafter be referred to as "reference posture") and a posture that the operator takes when carrying out a fine operation requiring precise adjustment of a position of the attachment 6, such as ground leveling work (which will hereinafter be referred to as "watching posture"). According to this embodiment, the posture tracking device 42 is configured to track changes in the posture of the operator in a real-time manner and consecutively measure the posture of the operator. A specific example of the posture tracking device 42 is as follows.

As shown in FIG. 2, for example, the posture tracking device 42 has an image capturing device 42*a* that captures an image of the upper half of the operator's body or of the operator's head, and an image processing section 42*b* that carries out image processing based on data on the image captured by the image capturing device 42*a*, thereby calculating information on a change in the position of the upper half of the operator's body or the position of the operator's head, that is, calculating information on a change in the posture of the operator. The information on the change in the posture of the operator, the information being calculated by the image processing section 42*b*, is input to the controller 50.

FIG. 4 is a side view schematically showing the reference posture of the operator sitting in the operator's seat 31. FIG. 5 is a side view schematically showing the watching posture that the operator sitting in the operator's seat 31 takes when carrying out the fine operation. When the posture of the operator is the watching posture shown in FIG. 5, as compared with the reference posture shown in FIG. 4, the upper half of the operator's body is bent forward or the operator's head is stuck out forward. Specifically, when the posture of the operator is the reference posture as shown in FIG. 4, the operator's head is at a position A1. However, when the posture of the operator is the watching posture as shown in FIG. 5, the operator's head is at a position A2 located forward relative to the position A1. Thus, a posture determining section 52 (to be described later) of the controller 50 can determine whether the posture of the operator has changed from the reference posture to the watching posture, based on information on a change in the posture of the operator, the information being sent from the image processing section 42*b* of the posture tracking device 42 to the posture determining section 52.

As shown in FIGS. 4 and 5, for example, the posture tracking device 42 may have a marker 42*d* fitted to the operator and the image capturing device 42*a* (see FIG. 2) that captures an image of the marker 42*d*. The marker 42*d* is fitted on, for example, the operator's head. The image capturing device 42*a* captures an image of the marker 42*d*, thus capturing a movement of the marker 42*d*. As a result, a change in the position of the operator (specifically, the position of the operator's head), that is, a change in the posture of the operator is detected.

As shown in FIGS. 4 and 5, for example, the posture tracking device 42 may have a transmitter 42*e* fitted to the operator and a receiver (not illustrated) that receives signals from the transmitter 42*e*. The transmitter 42*e* transmits an electric wave, and the receiver receives the electric wave. The transmitter 42*e* is, for example, fitted on the operator's head. The receiver is configured by, for example, a plurality of antennas. The plurality of antennas are arranged in, for example, different locations on the operator's seat 31. The electric wave transmitted from the transmitter 42*e* is received by the plurality of antennas, and a change in the position of the operator (specifically, the position of the operator's head), that is, a change in the posture of the operator is detected based on the intensity of the electric wave received by each of the plurality of antennas.

As shown in FIGS. 4 and 5, for example, the posture tracking device 42 may have a pressure sensor 42*c* capable of detecting a pressure (pressure distribution) that acts on the operator's seat 31 as a result of the operator's sitting in the operator's seat 31. The pressure sensor 42*c* is provided in at least one of the seat 34, the backrest 35, the headrest 36, and the armrest 37. When the posture of the operator changes from the reference posture to the watching posture, a pressure acting on a front part of the seat 34 increases as a pressure acting on a rear part of the seat 34 decreases. When the posture of the operator changes from the reference posture to the watching posture, a pressure acting on the backrest 35 and a pressure acting on the headrest 36 both decrease. When the posture of the operator changes from the reference posture to the watching posture, a pressure acting on a front part of each armrest 37 increases as a pressure acting on a rear part of each armrest 37 decreases. A pressure-related signal output from the pressure sensor 42*c* is input to the controller 50. Based on the incoming signal from the pressure sensor 42*c* of the posture tracking device 42, the posture determining section 52 of the controller 50 determines whether the posture of the operator has changed from the reference posture to the watching posture. In a case where the posture tracking device 42 is configured by the pressure sensor 42*c*, the posture tracking can be achieved more inexpensively in a simpler configuration than in a case where the posture tracking device 42 is configured by the image capturing device 42*a* and the image processing section 42*b*.

The attachment posture detection device 43 (see FIG. 3) is configured to detect a posture of the attachment 6. The attachment posture detection device 43 is configured to track changes in the posture of the attachment 6 in a real-time manner and consecutively measure the posture of the attachment 6. Based on information on the posture of the attachment 6 that is detected by the attachment posture detection device 43, a movement direction determining section 54 (to be described later) of the controller 50 is configured to determine a movement direction in which the attachment 6 moves (specifically, for example, a movement direction in which the bucket 5 moves). A specific example of the attachment posture detection device 43 is as follows.

The attachment posture detection device 43 includes, for example, a boom angle sensor (not illustrated) capable of detecting an angle of the boom 3 with respect to the upper slewing body 2, an arm angle sensor (not illustrated) capable of detecting an angle of the arm 4 with respect to the boom 3, a bucket angle sensor (not illustrated) capable of detecting an angle of the bucket 5 with respect to the arm 4, and a slewing angle sensor (not illustrated) capable of detecting an angle (slewing angle) of the upper slewing body 2 with respect to the lower travelling body 1. When a boom angle, an arm angle, a bucket angle, and a slewing angle are identified, a position of the bucket 5 is identified based on information indicating those identified angles. The above angle sensors are each configured by, for example, a rotary encoder or the like. Detection signals output from these angle sensors are input to the controller 50.

The attachment posture detection device 43, for example, may be a detection device utilizing the satellite positioning system. In such a case, the attachment posture detection device 43 has, for example, a GPS sensor capable of receiving data on the global positioning system (GPS), or a GNSS sensor capable of receiving data on the global navigation satellite system (GNSS). As shown in FIG. 1, the GPS sensor 43*a* or the GNSS sensor 43*a* is attached to the attachment 6 (specifically, for example, to the bucket 5). The attachment posture detection device 43 thus can detect the posture of the attachment 6 (specifically, the position of the bucket 5).

The communication device 61 (transmission and reception device) is disposed on the hydraulic excavator 100 or in the vicinity thereof. The communication device 61 is configured to receive signals output from the plurality of cameras 11 to 15, the attachment posture detection device 43, and the like and transmit the signals to the communication device 62 (transmission and reception device) disposed in the remote place. The communication device 61 is configured to receive signals transmitted from the communication device 62.

The communication device 62 (transmission and reception device) is disposed in the remote place. The communication device 62 is configured to receive signals transmitted from the communication device 61 and input the signals to the controller 50. The communication device 62 is configured to receive signals output from the controller 50 and transmit the signals to the communication device 61 disposed on the hydraulic excavator 100 or in the vicinity thereof.

According to this embodiment, the communication devices 61 and 62 are configured to transmit and receive signals to and from each other through wireless communication. However, the communication devices 61 and 62 are not limited thereto and may be configured to transmit and receive signals through wire communication.

The controller 50 is configured by, for example, a computer or the like. As shown in FIG. 3, the controller 50 has an operation determining section 51, the posture determining section 52, the image generating section 53, the movement direction determining section 54, and a correction section 55, which serves as functional sections.

The operation determining section 51 is configured to determine whether an operation applied to each of the remote operation levers 32 and 32 is a fine operation, based on operation information on the operation. In other words, the operation determining section 51 is configured to determine a type of work carried out by the hydraulic excavator 100, based on an incoming operation-based signal from each of the remote operation levers 32 and 32 (operation control function). Specifically, for example, when an amount of shift from a neutral position, which is an operation amount of the operation applied to each of the remote operation levers 32 and 32, is equal to or smaller than a preset reference value, the operation determining section 51 determines the operation to be a fine operation. When the operation amount is lager than the reference value, the operation determining section 51 determines the operation to be a normal operation different from the fine operation.

In the normal work, the remote operation lever 32 is operated, in many cases, by an operation amount in which the remote operation lever 32 makes a full stroke (full lever shift) or a stroke close to the full stroke. In the fine operation, on the other hand, the remote operation lever 32 is operated, in many cases, by an operation amount in which the remote operation lever 32 makes a half stroke (half lever shift) or a stroke equal to or smaller than the half stroke. Therefore, the reference value can be set as, for example, a value corresponding to an operation amount equivalent to the half lever shift or to an operation amount between the half lever shift and the full lever shift.

The operation determining section 51 may determine whether the operation is the fine operation, based on a temporal change of the operation amount from a point of time at which the operation of the operation lever 32 at the neutral position starts (i.e., a temporal change of the operation amount from a point of time at which the operator starts operating the operation lever 32). In such a case, when the operation lever 32 is operated from the neutral position at a speed lower than a preset reference value, that is, when the operation lever 32 is shifted from the neutral position at a speed lower than the preset reference value, the operation determining section 51 determines the operation to be the fine operation. When the operation lever 32 is operated from the neutral position at a speed equal to or higher than the reference value, the operation determining section 51 then determines the operation to be the normal operation.

The operation determining section 51 may determine whether the operation is the fine operation, based on detection or non-detection of a specific operation defined in advance as an operation related to the fine operation. One example of the specific operation is an operation of moving the attachment inch by inch (inching operation). In other words, the inching operation is the operation of causing the bucket 5 (tip attachment) to move with short strokes of movement. The operation determining section 51 may determine the operation applied to the operation lever 32 to be the fine operation when the inching operation is detected, and may determine the operation to be not the fine operation when the inching operation is not detected. Specifically, for example, when the operation lever 32 is reciprocated a number of times equal to or more than a preset reference number of times within a preset reference time, the operation determining section 51 may determine the operation to be the inching operation (fine operation). When the operation lever 32 is not reciprocated the number of times equal to or more than the reference number of times within the reference time, the operation determining section 51 may determine the operation to be not the inching operation (fine operation).

In a construction machine having a fine operation mode, the operation determining section 51 may determine whether an operation applied to the operation lever 32 is the fine operation in a manner described below. The construction machine having the fine operation mode has a switching unit (not illustrated) that allows the operator to switch the fine operation mode on and off. The switching unit has, for example, a changeover switch for changing the fine operation mode from an on-state to an off-state and vice versa. When the switching unit is in the on-state, that is, when the operation mode is the fine operation mode, the movement speed of the attachment 6 is limited to a speed equal to or lower than a preset speed. This allows the operator to easily carry out the fine operation. When the switching unit is in the off-state, that is, when the operation mode is the normal operation mode, the movement speed of the attachment 6 is not limited to any specific speed. The operator is thus allowed to carry out the normal operation. The switching unit inputs a signal indicating the operation mode being the fine operation mode or a signal indicating the operation mode being the normal operation mode, to the controller 50. In such a construction machine, the operation determining section 51 may determine whether an operation applied to the operation lever 32 is the fine operation, based on whether the operation mode is the fine operation mode. In other words, the operation determining section 51 can determine whether the operation is the fine operation, based on the signal that is input to the controller 50 as a result of changing of the operation mode by the switching unit.

The posture determining section 52 identifies a reference posture of the operator, based on the posture information on a posture of the operator sitting in the operator's seat 31, and determines whether the posture of the operator has changed from the reference posture to the watching posture related to the fine operation, based on the posture information.

The posture determining section 52 identifies the reference posture, for example, in a manner described below.

The posture determining section 52 identifies a posture that the operator takes when carrying out normal work, such as the excavation work and the transfer work, as the reference posture. Whether the normal work is being carried out is determined by the operation determining section 51, based on operation information on the operation applied to each of the remote operation levers 32 and 32.

Specifically, the posture determining section 52 identifies a posture that the operator takes when the operation determining section 51 determines the operation to be the normal operation (e.g., the posture of the operator shown in FIG. 4), as the reference posture, and stores the identified reference posture. The posture determining section 52 may identify the reference posture also in a different manner described below. Specifically, when the operation determining section 51 determines the operation to be the normal operation and the normal operation is maintained for a preset reference time, the posture determining section 52 may identify a posture that the operator takes in such a case, as the reference posture. In the latter case, determination on the reference posture is improved to become more precise than determination on the reference posture in the former case.

When the posture tracking device 42 includes the image capturing device 42a and the image processing section 42b, the reference posture is stored in the posture determining section 52 as, for example, image data on the posture of the operator. When the posture tracking device 42 has the pressure sensor 42c, the reference posture is stored in the posture determining section 52 as, for example, data on a pressure (data on a pressure distribution) that is detected by the pressure sensor 42c. When the posture tracking device 42 has the transmitter 42e and the receiver (e.g., a plurality of antennas), the reference posture is stored in the posture determining section 52 as, for example, electric wave intensity detected by the receiver.

Determination on the reference posture may be made only once in the initial stage of work using the hydraulic excavator 100, or may be made several times during the work using the hydraulic excavator 100. In a case where determination on the reference posture is made several times, the reference posture is updated such that a reference posture previously identified in the reference posture determination is replaced with the latest identified reference posture. In a specific example in which determination on the reference posture is made several times, for example, determination on the reference posture may be made every time the normal work is carried out during work using the hydraulic excavator 100.

The posture determining section 52 determines whether the posture of the operator has changed from the reference posture to the watching posture, for example, in a manner described below.

The posture determining section 52 stores therein a preset condition (watching posture determining condition) for identifying a posture that the operator takes when carrying out the fine operation during the ground leveling work or the like, as the watching posture. When the posture tracking device 42 includes the image capturing device 42a and the image processing section 42b, the watching posture determining condition is set as a threshold (angle threshold) for an angle of a forward-bending posture of the operator or a threshold (position threshold) for a position of the operator's head. When the posture tracking device 42 includes the pressure sensor 42c, the watching posture determining condition is set as a threshold (pressure threshold) for a pressure or pressure distribution. When the posture tracking device 42 includes the transmitter 42e and the receiver (e.g., a plurality of antennas), the watching posture determining condition is set as a threshold (electric wave intensity threshold) for electric wave intensity.

Specifically, when finding that the posture of the operator has changed from the reference posture to an extent equal to or larger than the threshold set as the watching posture determining condition, based on the posture information acquired by the posture tracking device 42, the posture determining section 52 can determine that the posture of the operator has changed from the reference posture to the watching posture. In a specific example shown in, for example, FIGS. 4 and 5, the position A1 of the operator's head that results when the operator takes the reference posture shown in FIG. 4 is compared with the position A2 of the operator's head that results when the operator takes a posture shown in FIG. 5, and when a distance between the position A1 and the position A2 is equal to or larger than the preset threshold, it can be determined that the posture of the operator has changed from the reference posture to the watching posture.

When finding that the posture of the operator has changed from the reference posture to an extent equal to or larger than the threshold and that the posture having changed to the extent equal to or larger than the threshold has been maintained for a preset determining time, based on the posture information acquired by the posture tracking device 42, the posture determining section 52 may determine that the posture of the operator has changed from the reference posture to the watching posture. In the latter case, determination on a posture change from the reference posture to the watching posture is improved to become more precise than determination on a posture change in the former case.

Figure 6:
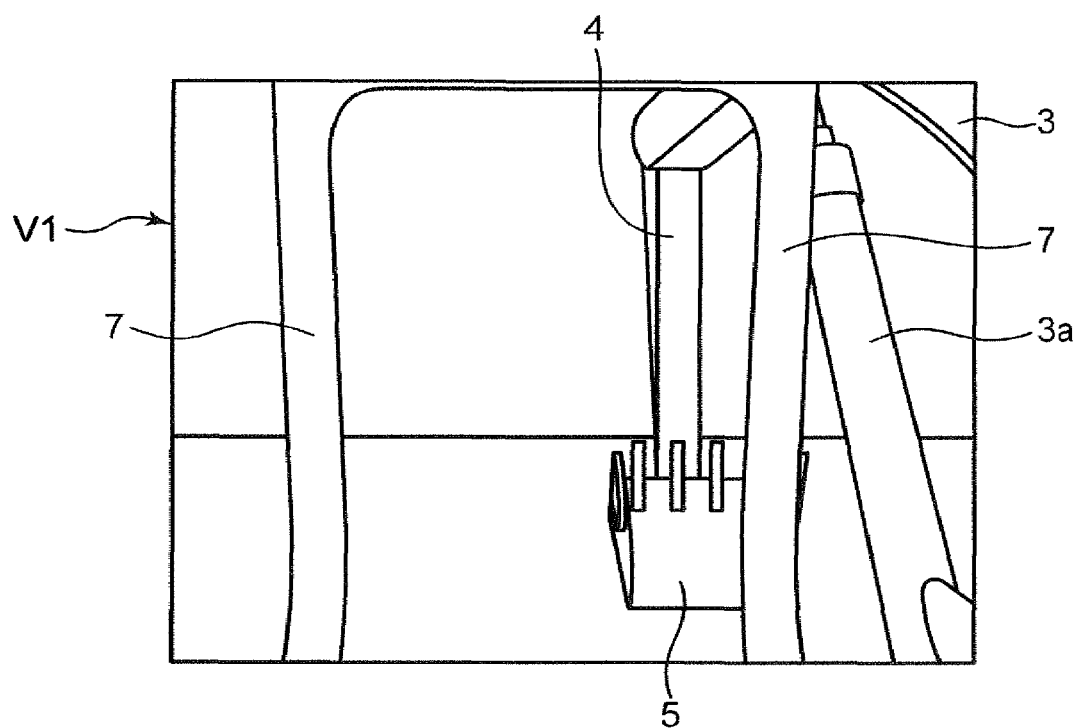
FIG. 6 shows an example of an image displayed on the display device of the remote operation device.

During the normal work, the image generating section 53 causes the monitor 21 to display a work image V1 acquired by the main camera 11, as shown in FIG. 6. When work carried out by the hydraulic excavator 100 has changed from the normal work to work involving the fine operation (e.g. inching work), the image generating section 53 carries out control described below to cause the monitor 21 to display an enlarged image V2. Images shown in FIGS. 6 to 12 are images (work images) that are captured by the main camera 11 disposed in the cab 7 and that are displayed on the monitor 21. These images, therefore, each include an image of a frame (glass supporting frame) included in the cab 7. In FIGS. 6 to 12, a reference symbol 7 denotes the frame of the cab 7.

When the operation determining section 51 determines that a first condition is met, the first condition being that the operation is the fine operation, and the posture determining section 52 determines that a second condition is met, the second condition being that the posture of the operator has changed from the reference posture to the watching posture, the image generating section 53 generates an enlarged image by enlarging a part of the work image displayed on the monitor 21, the part being related to the line-of-sight position acquired by the eye tracking device 41, and causes the monitor 21 to display the enlarged image.

Figure 7:
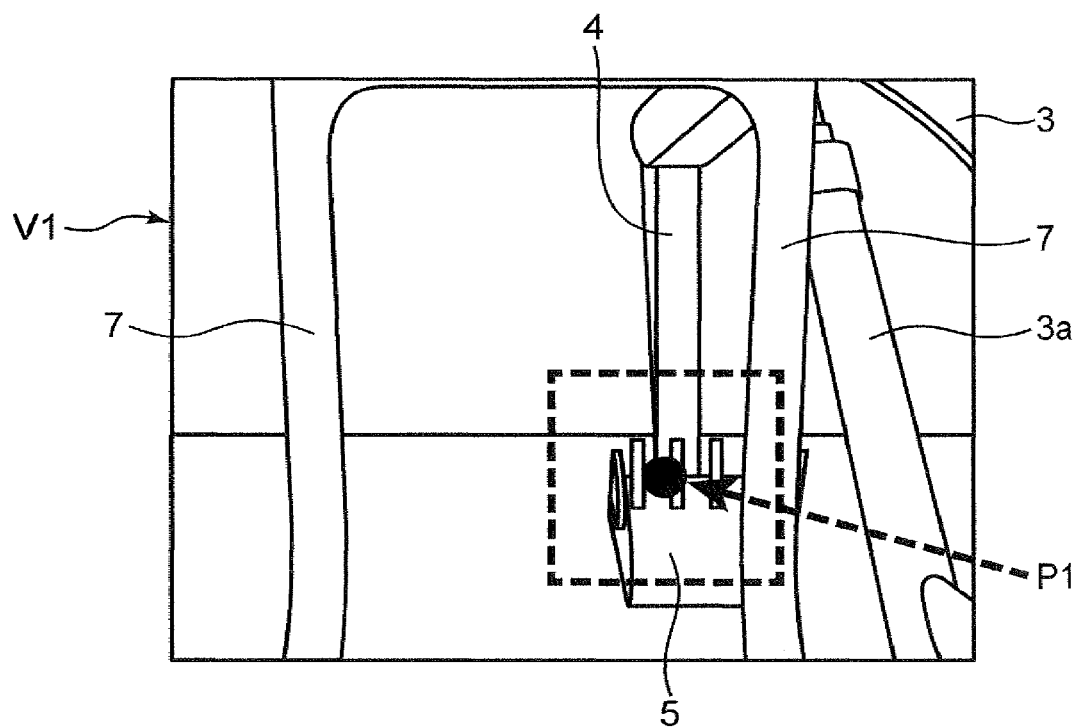
FIG. 7 shows another example of an image displayed on the display device of the remote operation device.
Figure 8:
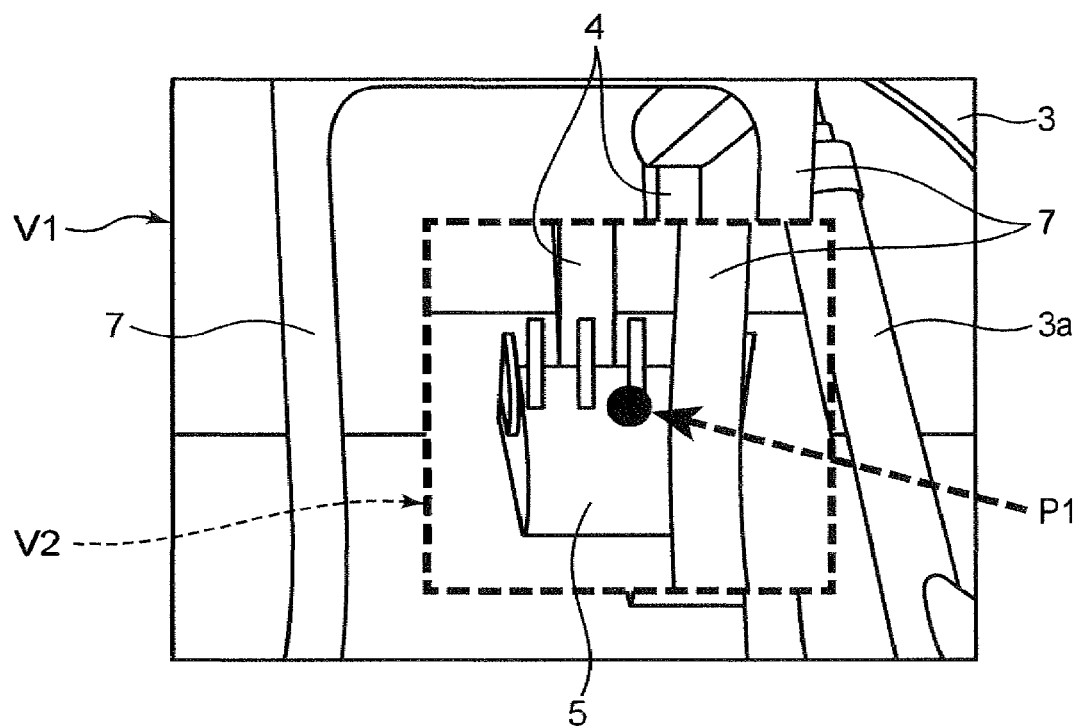
FIG. 8 shows still another example of an image displayed on the display device of the remote operation device.

Specifically, for example, the image generating section 53 generates an enlarged image V2 enlarged such that a part of the work image V1 is located in the center of the enlarged image V2, the part corresponding to a line-of-sight position P1 of the operator (see FIG. 7), and causes the monitor 21 to display the enlarged image V2 such that the enlarged image V2 is superposed on the work image V1, as shown in FIG. 8. This means that the enlarged image V2 pops up on the monitor 21. In FIG. 7, the line-of-sight position P1 of the operator is at the attachment 6 (specifically, at the bucket 5).

When it is determined that the first and second conditions are met and the line-of-sight position is held in a preset watching range for a preset watching time or longer, the image generating section 53 may generate the enlarged image V2 enlarged such that the part corresponding to the line-of-sight position P1 is located in the center of the enlarged image V2 and cause the monitor 21 to display the enlarged image V2 so as to be superposed on the work image V1.

The generated enlarged image V2 is kept displayed on the monitor 21 until a preset display condition is met. One example of the display condition is to keep displaying the enlarged image V2 until the watching posture returns to the reference posture. In such a case, the image generating section 53 keeps displaying the enlarged image V2 on the monitor 21 from a point of time of the enlarged image V2 being displayed on the monitor 21 to a point of time of the watching posture changing to the reference posture. The display condition is not limited to the above condition. The display condition may be, for example, a condition that the enlarged image V2 is kept displayed for a preset display time having elapsed from a point of time of the enlarged image V2 being displayed on the monitor 21.

Figure 9:
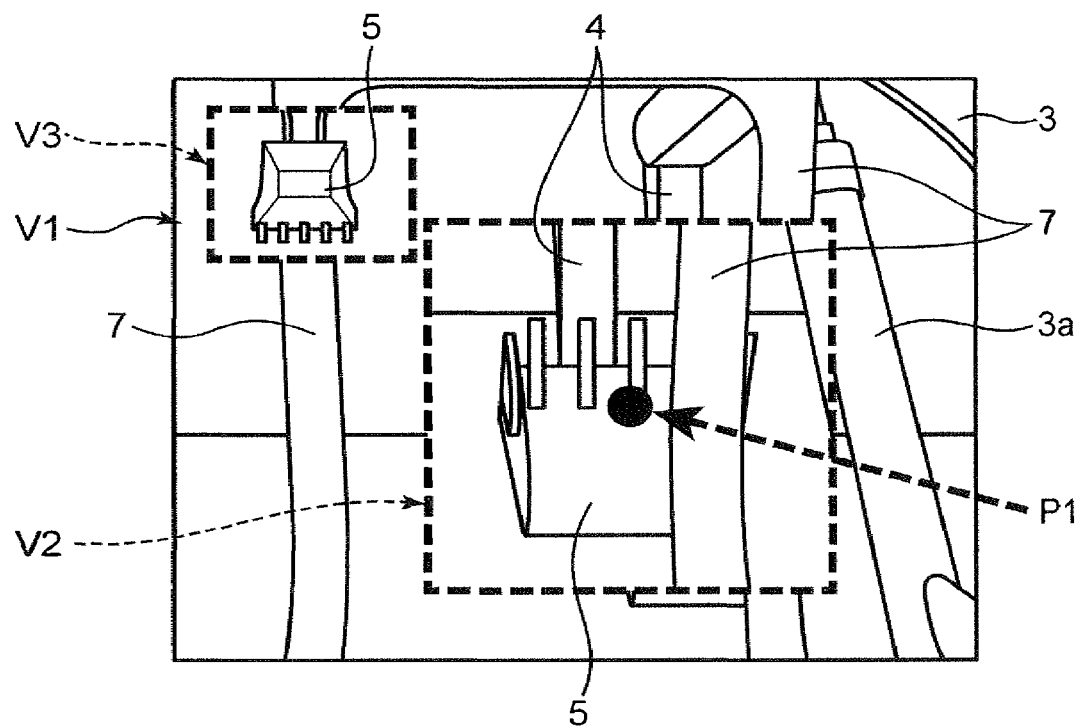
FIG. 9 shows still another example of an image displayed on the display device of the remote operation device.
Figure 10:
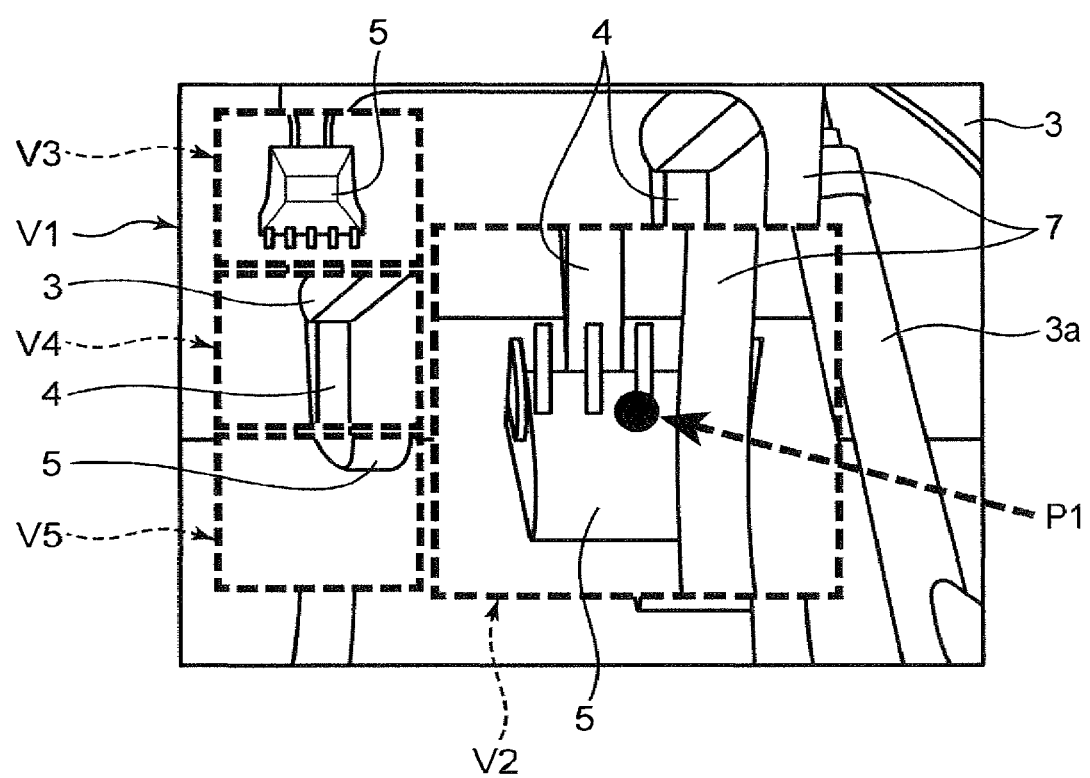
FIG. 10 shows still another example of an image displayed on the display device of the remote operation device.

According to this embodiment, the image generating section 53 is configured to cause the monitor 21 to display the above-mentioned different image together with the enlarged image V2, as shown in FIGS. 9 and 10. Specifically, the image generating section 53 is configured to cause the monitor 21 to display at least one of the work image V1 and the enlarged image V2, which is acquired by the main camera 11, and at least one of a plurality of the different images acquired by the different viewpoint cameras 12 to 15. In a display example shown in FIG. 9, the image generating section 53 displays the enlarged image V2 such that it is superposed on the work image V1 and displays also a different image V3, which is acquired by the different viewpoint camera 12, such that the different image V3 is superposed on the work image V1 as well. In a display example shown in FIG. 10, the image generating section 53 displays the enlarged image V2 such that it is superposed on the work image V1 and displays also different images V3 to V5, which are acquired by the different viewpoint cameras 12 to 14, such that the different images V3 to V5 are superposed on the work image V1 as well.

Specifically, the different image V3 is an image of the bucket 5 that is captured by the different viewpoint camera 12. The different image V4 is an image of a turning part connecting the boom 3 to the arm 4, the image being captured by the different viewpoint camera 14. The different image V5 is an image of a lower part of the bucket 5 and a space under the lower part, the image being captured by the different viewpoint camera 13. The image generating section 53 can separately put these different images V3 to V5 on display or non-display as necessary. The image generating section 53 can also separately switch respective display positions of the different images V3 to V5 on the monitor 21 (i.e., can swap the display positions with each other). Further, the image generating section 53 can switch to the different viewpoint camera 15 having a viewpoint for looking down on the construction machine and cause the monitor 21 to display an image captured by the different viewpoint camera 15.

As described above, according to this embodiment, the image generating section 53 is configured to generate (combine) the work image V1, the enlarged image V2, and one or a plurality of images selected from the different images V3 to V5 and cause the monitor 21 to display the combined images (image combining function).

According to this embodiment, the image generating section 53 may generate an enlarged image V2' by enlarging a part related to a corrected line-of-sight position P2, which is specified by correcting the line-of-sight position P1 in a manner described below. This process is described specifically as follows.

The movement direction determining section 54 determines a movement direction in which the attachment 6 moves. Specifically, according to this embodiment, the movement direction determining section 54 determines the movement direction of the attachment 6 (e.g., a movement direction in which the bucket 5 moves), based on information on the posture of the attachment 6 that is detected by the attachment posture detection device 43. Specifically, when the boom 3 makes a rising movement to rise upward as the upper slewing body 2 makes a turning movement to the right, the movement direction of the attachment 6 (movement direction of the bucket 5) is diagonally upward to the right. When the boom 3 makes no rising and falling movement and neither the arm 4 nor the bucket 5 makes a turning movement as the upper slewing body 2 solely makes a turning movement to the right, the movement direction of the attachment 6 (movement direction of the bucket 5) is rightward. When the upper slewing body 2 makes no turning movement but at least one of the boom 3, the arm 4, and the bucket 5 makes its rising and falling movement or turning movement, the movement direction of the attachment 6 (movement direction of the bucket 5) is an up-and-down direction or a direction including a component of the up-and-down direction.

Figure 11:
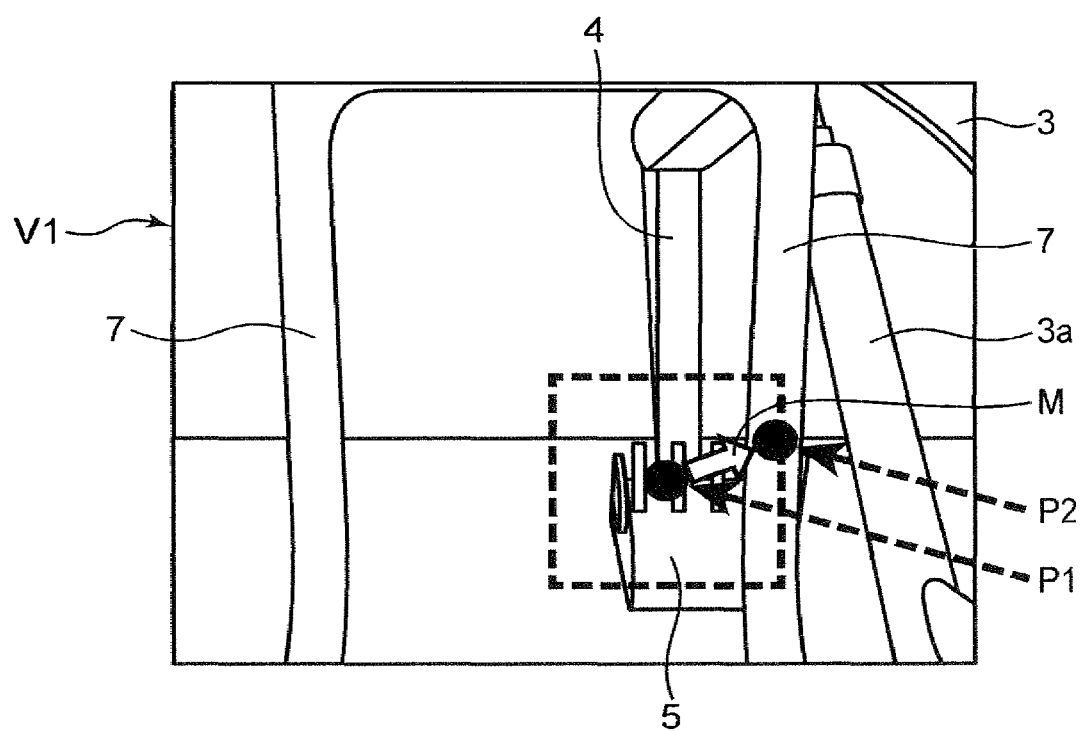
FIG. 11 shows still another example of an image displayed on the display device of the remote operation device.

As shown in FIG. 11, the correction section 55 calculates the corrected line-of-sight position P2 that is separated from the line-of-sight position P1 in a direction corresponding to a movement direction M (movement direction M of the attachment 6), the line-of-sight position P1 being acquired by the eye tracking device 41. Specifically, the correction section 55 corrects the line-of-sight position P1, based on a preset correction method, to calculate the corrected line-of-sight position P2. One example of the correction method is to specify a position on the work image V1 that is shifted by a preset correction value in the movement direction M from the line-of-sight position P1, as the corrected line-of-sight position P2. In another example of the correction method, the correction value may be determined to be larger as the movement speed of the attachment 6 in the movement direction M gets higher. According to this correction method, on the work image V1, the corrected line-of-sight position P2 is set to a position that is shifted from the line-of-sight position P1 in the movement direction M by an extent equal to the correction value that depends on the movement speed.

Figure 12:
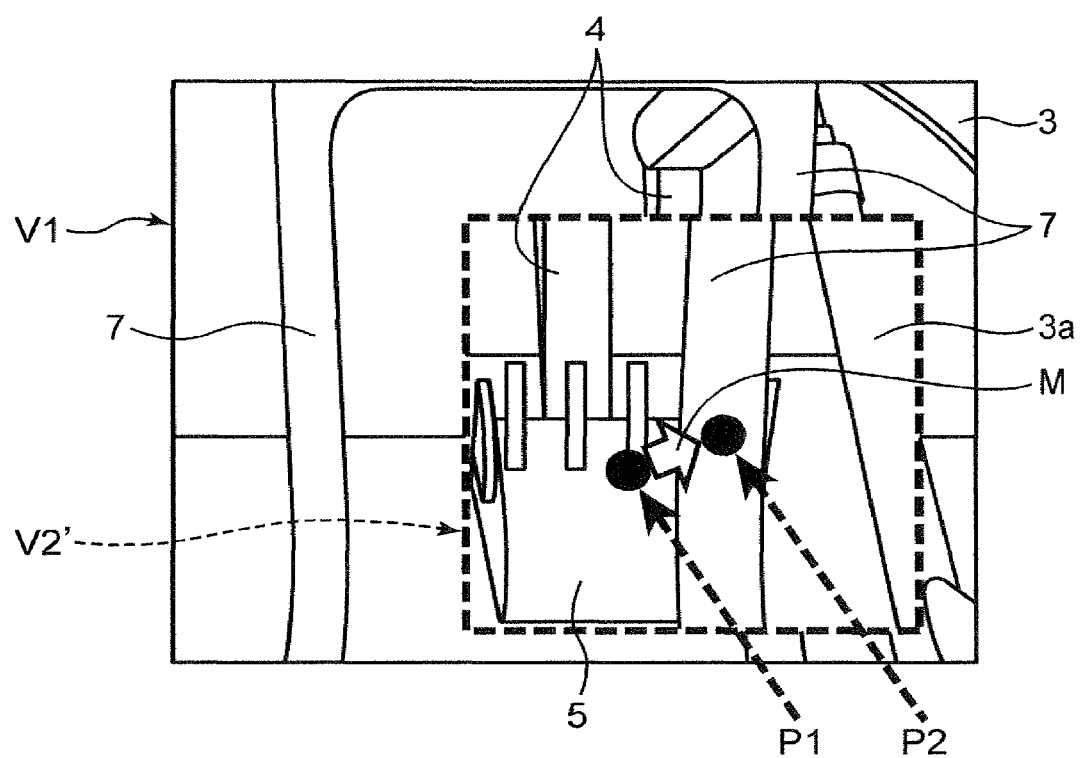
FIG. 12 shows still another example of an image displayed on the display device of the remote operation device.

As shown in FIG. 12, the image generating section 53 is configured to generate an enlarged image V2' (corrected enlarged image) enlarged such that a part corresponding to the corrected line-of-sight position P2 specified in the above manner is located in the center of the enlarged image V2' and cause the monitor 21 to display the enlarged image V2'.

Figure 13:
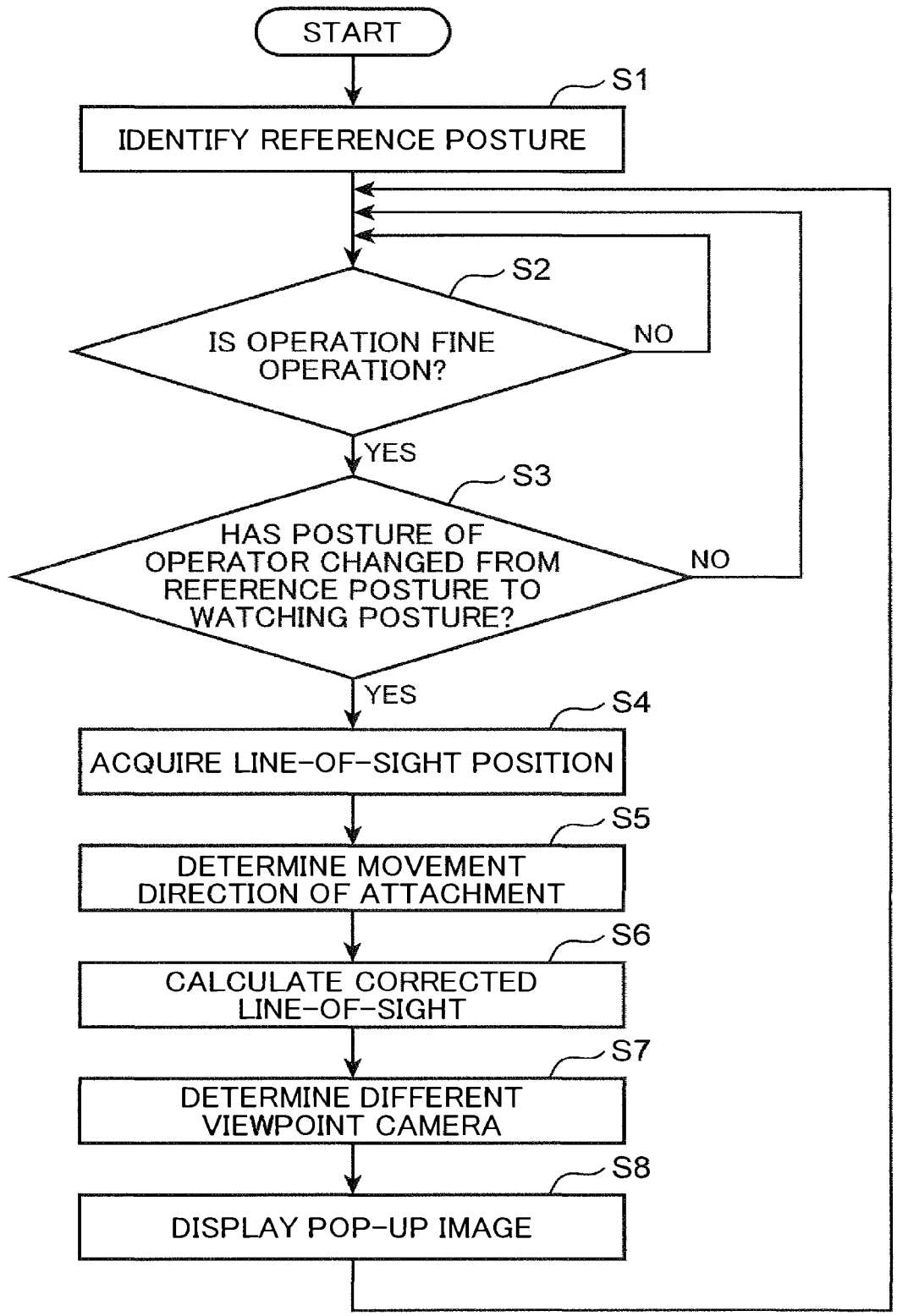
FIG. 13 is a flowchart showing a calculation control processing executed by a controller of the remote operation device.

A calculation control processing carried out by the controller 50 of the remote operation device 101 according to this embodiment will then be described with reference to a flowchart shown in FIG. 13.

When the hydraulic excavator 100 starts its work, the posture determining section 52 of the controller 50 identifies the reference posture by the identifying method described above (step S1).

The operation determining section 51 determines whether an operation applied to each of the remote operation levers 32 and 32 is a fine operation, based on information on the operation (operation-based signal) (step S2). When determining that the operation is not the fine operation (NO in step S2), the operation determining section 51 repeats the determining process of step S2.

When it is determined that the operation is the fine operation (YES in step S2), the posture determining section 52 determines whether a posture of the operator has changed from the reference posture to the watching posture (step S3). When it is determined that the posture of the operator has not changed from the reference posture to the watching posture (NO in step S3), the processes of steps S2 and S3 are repeated.

When it is determined that the posture of the operator has changed from the reference posture to the watching posture (YES in step S3), the eye tracking device 41 acquires the line-of-sight position P1 of the operator (step S4).

Subsequently, the movement direction determining section 54 determines a movement direction of the attachment 6, based on information on a posture of the attachment 6 that is detected by the attachment posture detection device 43 (step S5).

Subsequently, based on the line-of-sight position P1 acquired by the eye tracking device 41 and on the movement direction M calculated by the movement direction determining section 54, the correction section 55 calculates the corrected line-of-sight position P2 that is separated from the line-of-sight position P1 in the direction corresponding to the movement direction M (step S6).

Subsequently, the controller 50 determines a different viewpoint camera that acquires a different image to be displayed together with the enlarged image on the monitor 21 (step S7). Specifically, the controller 50 selects one or a plurality of different viewpoint cameras out of the plurality of different viewpoint cameras 12 to 15. More specifically, it is preferable that the controller 50 select, for example, a different viewpoint camera that can acquire a different image containing a part corresponding to the line-of-sight position P1 of the operator, out of the plurality of different viewpoint cameras 12 to 15.

Subsequently, the image generating section 53 generates the enlarged image V2' enlarged such that a part of the work image V1 displayed on the monitor 21 is located in the center of the enlarged image V2', the part corresponding to the corrected line-of-sight position P2 calculated by the correction section 55, and causes the monitor 21 to display the enlarged image V2' (step S8). The controller 50 repeats the processes of steps S2 to S8.

According to the above-described remote operation device 101 of this embodiment, when the operation determining section 51 determines that the first condition is met, the first condition being that the operation is the fine operation, and the posture determining section 52 determines that the second condition is met, the second condition being that the posture of the operator has changed from the reference posture to the watching posture, the operator is highly likely to have an intention to carry out the fine operation, in which case the enlarged image V2 generated by enlarging a part related to the line-of-sight position P1 is automatically displayed on the monitor 21. In this manner, when the fine operation is carried out through remote operation, an image that the operator needs can be displayed on the monitor 21 in an understandable form at a proper timing. This allows the operator to efficiently carry out the fine operation, which requires high precision, while observing the enlarged image V2 displayed on the monitor 21. Hence, work efficiency in carrying out the fine operation is improved.

According to this embodiment, the enlarged image V2 is displayed on the monitor 21 only in the case where the first and second conditions are both met. In other cases, no enlarged image V2 is displayed on the monitor 21 but the work image V1 acquired by the main camera 11 is displayed on the monitor 21. Specifically, the enlarged image V2 is displayed on the monitor 21 only when display of the enlarged image V2 is necessary. Therefore, when display of the enlarged image V2 is unnecessary, no enlarged image V2 is displayed on the monitor 21 but the work image V1, which is an image with a visual field range wider than that of the enlarged image V2, is displayed on the monitor 21. Hence, images to be displayed on the monitor 21 can be switched in a manner appropriate for various types of work, which improves work efficiency and operability.

According to this embodiment, the image generating section 53 is configured to cause the monitor 21 to display some or all of the different images acquired by the different viewpoint cameras 12 to 15 together with at least one of the work image V1 acquired by the main camera 11 and the enlarged image V2 generated by the image generating section 53. Therefore, the operator is able to carry out the fine operation while taking into account not only the work image V1 and/or enlarged image V2 but also the different images V3 to V5 acquired by the different viewpoint cameras 12 to 15. In this manner, the operator is able to carry out the fine operation while observing images captured at various angles.

During work involving the fine operation, the operator carries out the fine operation while taking into account the enlarged image V2 as well as an image of the bucket 5, i.e., the different image, thus being able to carry out the fine operation further efficiently.

According to this embodiment, it is preferable that the image generating section 53 generate the enlarged image V2' by enlarging a part of the work image V1, the part being related to the line-of-sight position P2, and cause the monitor 21 to display the enlarged image V2'. In such a case, the enlarged image V2' allowing the operator to easily observe a destination of movement of the attachment 6 of the hydraulic excavator 100 is displayed on the monitor 21. This makes it easy for the operator to determine what situation the destination of movement of the attachment 6 is in. As a result, work efficiency in carrying out the fine operation is further improved.

[Modifications]

The present invention is not limited to the above-described embodiment. The present invention includes, for example, the following aspects.

(A) Construction Machine

The remote operation device is applied not only to the hydraulic excavator 100 described exemplarily in the embodiment but can also be applied widely to other construction machines, such as a crane and a bulldozer.

(B) Tip Attachment

In the remote operation device, the tip attachment is not limited to the bucket 5 described exemplarily in the embodiment. The tip attachment may be, for example, a grapple that grasps and carries scraps in a scrapyard or the like, a crusher (disintegrator) that carries out demolition work of demolishing a concrete building or the like, a breaker used to drill bedrocks, break rocks into pieces, and crush concrete, or a fork that holds an object to be transferred.

(C) Image Acquiring Device

The remote operation device only needs to include at least the image acquiring device (main camera 11), and the different image acquiring devices (different viewpoint cameras 12 to 15) can be omitted.

(D) Fine Operation and Watching Posture

In the embodiment, the inching operation that the operator applies to the remote operation lever 32 when carrying out ground leveling work using the bucket 5 of the hydraulic excavator 100 is described exemplarily as the fine operation, and the posture of the operator that is related to the inching operation carried out during the ground leveling work is described exemplarily as the watching posture. However, the fine operation is not limited to the inching operation, and the watching posture is not limited to the posture related to the inching operation. Specifically, the fine operation is the operation that the operator applies to the remote operation lever in order to remotely operate the construction machine, and should be the operation with a high requirement that for precise adjustment of the position of the attachment, the enlarged image generated by enlarging a part related to the line-of-sight position of the operator be displayed on the display device disposed in the remote place. As such an operation, the fine operation may be determined properly according to a type of the construction machine, a type of work, or the like. The watching posture is the posture of the operator that is related to the fine operation, and should be the posture that the operator takes when watching a part of the attachment. As such a posture, the watching posture may be determined properly so that it is related to the fine operation properly determined according to a type of the construction machine, a type of work, or the like. Work involving the fine operation is not limited to the ground leveling work described exemplarily in the embodiment, but includes various types of work in which the attachment is moved slowly to precisely adjust the position of the attachment.

(E) Specific Parts

Specific parts of the attachment, of which images are acquired by the different image acquiring devices, are not limited to the parts described exemplarily in the embodiment. Specifically, the bucket 5 of which an image is captured by the different viewpoint camera 12, the lower part, of the bucket 5, of which an image is captured by the different viewpoint camera 13, and the turning part, connecting the boom 3 to the arm 4, of which an image is captured by the different viewpoint camera 14 are described exemplarily in this embodiment. However, the specific parts are not limited to these parts. Other parts that the operator should watch or desires to watch during work involving the fine operation may also be specified properly as such specific parts.

SUMMARY OF EMBODIMENT

Technical features of this embodiment can be summarized as follows.

In order to solve the above problems, the inventors have focused on, for example, a posture that the operator takes when carrying out normal work, such as the excavation work and the transfer work, and on, for example, a posture that the operator takes when carrying out work involving the fine operation requiring highly precise adjustment of the position of the attachment, such as ground leveling work by the bucket and grasping work by a crusher or grapple. Specifically, when carrying out the normal operation, the operator, in many cases, observes a relatively wide area in a work area visually recognizable to the operator in the operator's seat. Therefore, the operator tends to sit deep down in the operator's seat in such a case. In contrast, when carrying out the fine operation, the operator, in many cases, observes a relatively narrow area in the work area visually recognizable to the operator in the operator's seat. Specifically speaking, in many cases, the operator watches only the tip attachment, such as the bucket, the crusher and the grapple, and therefore tends to sit on the edge of the operator's seat to bend the upper half of the operator's body forward. This means that the posture of the operator during work is deeply related to a type of work carried out by the operator. By using not only the operation information on an operation applied to the remote operation lever but also posture information on the posture of the operator, as criteria for determining whether the operator has an intention to carry out the fine operation, it becomes possible to precisely determine that the operator has an intention to carry out the fine operation. As a result, an image the operator needs when carrying out the fine operation can be displayed on the display device, which is disposed in a remote place, in an understandable form at proper timing.

A remote operation device for a construction machine has been devised from such a point of view as described above. The remote operation device is a device for remotely operating a construction machine having an attachment from a remote place distant from the construction machine. The remote operation device includes: an image acquiring device that acquires a work image of the construction machine; a display device that displays the work image at the remote place; an operator's seat in which an operator sits at the remote place; a remote operation lever to which an operation is applied by the operator sitting in the operator's seat, the operation being an operation for causing the attachment to move; an eye tracking device that acquires a line-of-sight position of the operator sitting in the operator's seat; a posture tracking device that acquires posture information on a posture of the operator sitting in the operator's seat; an operation determining section that determines whether the operation applied to the remote operation lever is a fine operation, based on operation information on the operation; a posture determining section that identifies a reference posture of the operator, based on the posture information, the posture determining section determining whether the posture of the operator has changed from the reference posture to a watching posture related to the fine operation, based on the posture information; and an image generating section that generates, when the operation determining section determines the operation to be the fine operation and the posture determining section determines that the posture of the operator has changed from the reference posture to the watching posture, an enlarged image by enlarging a part of the work image, the part being related to the line-of-sight position acquired by the eye tracking device, and causes the display device to display the enlarged image.

According to the remote operation device for the construction machine, when the operation determining section determines the operation to be the fine operation and the posture determining section determines that the posture of the operator has changed from the reference posture to the watching posture, the operator is highly likely to have an intention to carry out the fine operation, in which case the enlarged image generated by enlarging a part related to the line-of-sight position is automatically displayed on the display device. In this manner, when the fine operation is carried out through remote operation, an image the operator needs can be displayed on the display device, which is disposed in the remote place, in an understandable form at a proper timing. This allows the operator to efficiently carry out the fine operation, which requires high precision, while observing the enlarged image displayed on the display device. Hence, work efficiency in carrying out the fine operation is improved.

The fine operation is the operation that the operator applies to the remote operation lever in order to remotely operate the construction machine, and is the operation with a high requirement that for precise adjustment of the position of the attachment, the enlarged image generated by enlarging a part related to the line-of-sight position of the operator be displayed on the display device disposed in the remote place. The watching posture is the posture of the operator that is related to the fine operation, and is the posture that the operator takes when watching a part of the attachment.

It is preferable that the remote operation device further include a different image acquiring device having a visual field different from a visual field of the image acquiring device, the different image acquiring device acquiring a different image different from the work image acquired by the image acquiring device, in which the image generating section is configured to cause the display device to display the different image acquired by the different image acquiring device together with at least one of the work image acquired by the image acquiring device and the enlarged image generated by the image generating section.

In this aspect, the operator is able to carry out work involving the fine operation while taking into account not only the work image or the enlarged image but also the different image acquired by the different image acquiring device. This further improves work efficiency in carrying out the fine operation.

It is also preferable that in the remote operation device, the different image acquiring device be configured to acquire an image of a specific part of the attachment, as the different image.

In this aspect, during work involving the fine operation, the operator is able to check a part of the attachment that the operator should watch or desires to watch, on the display device.

It is also preferable that in the remote operation device, the attachment include a tip attachment making up a tip of the attachment, and that the different image acquiring device be configured to acquire at least an image of the tip attachment, as the different image.

During work involving the fine operation, the operator watches the tip attachment in many cases. Therefore, in this aspect, the operator is able to carry out the fine operation further efficiently while taking into account the enlarged image as well as the image of the tip attachment, i.e., the different image.

It is preferable that the remote operation device further include a movement direction determining section that determines a movement direction in which the attachment moves, and a correction section that calculates a corrected line-of-sight position separated from the line-of-sight position in a direction corresponding to the movement direction, the line-of-sight position being acquired by the eye tracking device, in which the image generating section is configured to generate an enlarged image by enlarging a part of the work image, the part being related to the corrected line-of-sight position, and cause the display device to display the enlarged image.

In this aspect, the enlarged image generated by enlarging the part related to the correct line-of-sight position, that is, the enlarged image allowing the operator to easily observe a destination of movement of the attachment of the construction machine is displayed on the display device. This makes it easy for the operator to determine what situation the destination of movement of the attachment is in. As a result, work efficiency in carrying out the fine operation is further improved.

As described above, when a fine operation is carried out through remote operation, the remote operation device causes the display device disposed in a remote place to display an image the operator needs in an understandable form at proper timing, thereby improving work efficiency in carrying out the fine operation.

The invention claimed is:

1. A remote operation device for remotely operating a construction machine having an attachment from a remote place distant from the construction machine, the remote operation device comprising:
    an image acquiring device including a first camera that acquires a work image of the construction machine;
    a display device including a monitor that displays the work image at the remote place;
    an operator's seat in which an operator sits at the remote place;
    a remote operation lever to which an operation is applied by the operator sitting in the operator's seat, the operation being an operation for causing the attachment to move;
    an eye tracker that acquires a line-of-sight position of the operator sitting in the operator's seat;
    a posture tracker that acquires posture information on a posture of the operator sitting in the operator's seat; and
    a controller comprising:
        an operation determining section that determines whether the operation applied to the remote operation lever is a fine operation, based on operation information on the operation,
        a posture determining section that identifies a reference posture of the operator, based on the posture information, the posture determining section determining whether the posture of the operator has changed from the reference posture to a watching posture related to the fine operation, based on the posture information, and
        an image generating section that generates, when the operation determining section determines the operation to be the fine operation and the posture determining section determines that the posture of the operator has changed from the reference posture to the watching posture, an enlarged image by enlarging a part of the work image, the part being related to the line-of-sight position acquired by the eye tracker, and causes the display device to display the enlarged image.

2. The remote operation device according to claim 1, further comprising a different image acquiring device including a second camera having a visual field different from a visual field of the image acquiring device, the different image acquiring device acquiring a different image different from the work image acquired by the image acquiring device, wherein the image generating section is configured to cause the display device to display the different image acquired by the different image acquiring device together with at least one of the work image acquired by the image acquiring device and the enlarged image generated by the image generating section.

3. The remote operation device according to claim 2, wherein the different image acquiring device is configured to acquire an image of a specific part of the attachment, as the different image.

4. The remote operation device according to claim 3, wherein
the attachment includes a tip attachment making up a tip of the attachment, and
the different image acquiring device is configured to acquire at least an image of the tip attachment, as the different image.

5. The remote operation device according to claim 1, wherein the controller further comprises:
a movement direction determining section that determines a movement direction in which the attachment moves, and
a correction section that calculates a corrected line-of-sight position separated from the line-of-sight position in a direction corresponding to the movement direction, the line-of-sight position being acquired by the eye tracker, and
wherein the image generating section is configured to generate an enlarged image by enlarging a part of the work image, the part being related to the corrected line-of-sight position, and cause the display device to display the enlarged image.

6. The remote operation device according to claim 1, wherein the posture determining section determines that the posture of the operator has changed from the reference posture to the watching posture related to the fine operation when the posture information indicates that a head of the user has moved forward.

7. The remote operation device according to claim 1, wherein the posture determining section determines that the posture of the operator has changed from the reference posture to the watching posture related to the fine operation when the posture information indicates that an upper half of the user has bent forward.

* * * * *